US012715595B2

(12) United States Patent
Combes et al.

(10) Patent No.: US 12,715,595 B2
(45) Date of Patent: Aug. 25, 2026

(54) PROPULSION SYSTEM FOR AN AIRCRAFT COMPRISING A TURBOJET, A PYLON AND ENGINE ATTACHMENT

(71) Applicant: Airbus Operations SAS, Toulouse (FR)

(72) Inventors: Pierre-Antoine Combes, Toulouse (FR); Marc De Nicola, Toulouse (FR); Germain Gueneau, Toulouse (FR); Olivier Pautis, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 108 days.

(21) Appl. No.: 18/761,974

(22) Filed: Jul. 2, 2024

(65) Prior Publication Data

US 2025/0010998 A1 Jan. 9, 2025

Related U.S. Application Data

(60) Provisional application No. 63/512,099, filed on Jul. 6, 2023.

(30) Foreign Application Priority Data

Jun. 25, 2024 (EP) .................................... 24184399

(51) Int. Cl.
*B64D 27/40* (2024.01)
*B64D 27/18* (2006.01)

(52) U.S. Cl.
CPC ........... *B64D 27/402* (2024.01); *B64D 27/18* (2013.01)

(58) Field of Classification Search
CPC ........ B64D 27/06; B64D 27/12; B64D 27/18; B64D 27/31; B64D 27/40; B64D 27/402; B64D 27/404; B64D 27/406; B64D 29/02
See application file for complete search history.

(56) References Cited

U.S. PATENT DOCUMENTS

| | | | |
|---|---|---|---|
| 2012/0085859 A1 | 4/2012 | Barnes et al. | |
| 2013/0240666 A1 | 9/2013 | Schnelz | |
| 2017/0043878 A1 | 2/2017 | Pautis et al. | |
| 2018/0186462 A1* | 7/2018 | Brochard | F02C 7/20 |
| 2019/0009918 A1* | 1/2019 | Zameroski | B64D 27/402 |
| 2019/0270524 A1* | 9/2019 | Eichstadt | B64D 27/12 |
| 2020/0298986 A1* | 9/2020 | Cayssials | B64D 27/404 |
| 2021/0086906 A1 | 3/2021 | Hellegouarch et al. | |
| 2021/0094695 A1* | 4/2021 | Hellegouarch | B64D 27/404 |

(Continued)

OTHER PUBLICATIONS

European Search Report from corresponding European application No. EP24184399 dated Oct. 7, 2024.

*Primary Examiner* — Joshua D Huson
*Assistant Examiner* — Anna L. Gordon
(74) *Attorney, Agent, or Firm* — Greer, Burns & Crain, Ltd.

(57) ABSTRACT

An aircraft propulsion system comprising a turbojet having a fan casing with a rear face, a pylon with a front part and a lower spar with a rear fitting fixed to it, and a front engine attachment fixed between an upper part of the fan casing and the front part, a front arch having two arms, each having a first end fixed to the lower spar and a second end fastened in an articulated manner to the rear face, and two lateral rods, each having a first end fastened in an articulated manner to the rear fitting and a second end fastened in an articulated manner to the rear face.

12 Claims, 4 Drawing Sheets

(56) References Cited

U.S. PATENT DOCUMENTS

| | | | | |
|---|---|---|---|---|
| 2023/0182911 | A1 | 6/2023 | Stretton | |
| 2023/0365247 | A1 * | 11/2023 | Stevens | B64D 27/18 |
| 2024/0239502 | A1 * | 7/2024 | Glemarec | B64D 27/404 |

* cited by examiner 104
100
106
150
106a
106d
174
106e
152a
172
106c
152c
206a
206b
108
60a
106b
302
156
301
60b
10c
303
60c
Z
604
X
Y
152
154
105
152b
10b
102
10a
103a
103

PROPULSION SYSTEM FOR AN AIRCRAFT COMPRISING A TURBOJET, A PYLON AND ENGINE ATTACHMENT

CROSS-REFERENCES TO RELATED APPLICATIONS

This application claims the benefit of U.S. Patent Application No. 63/512,099 filed on Jul. 6, 2023 and European Patent Application Number 24184399.4 filed on Jun. 25, 2024, the entire disclosures of which is incorporated herein by way of reference.

FIELD OF THE INVENTION

The present invention relates to the general field of attachment of a turbojet under the wing of an aircraft. It concerns in particular a propulsion system comprising a turbojet, in particular a double-flow engine, a pylon and a front engine attachment and an arch for fixing the turbojet under the pylon. It also applies to an aircraft equipped with such a propulsion system.

BACKGROUND OF THE INVENTION

A state-of-the-art propulsion system is attached under a wing of an aircraft. It has a turbojet and a pylon through which the turbojet is attached under the wing. The pylon has a rigid structure, also known as primary structure, with attachment elements for attaching the turbojet.

These attachment elements consist of a front engine attachment, a rear engine attachment, and a device to resume the thrust forces generated by the turbojet.

The pylon also has other attachment elements allowing the attachment of the pylon to the wing.

Although such a structure is satisfactory, it is desirable to find an alternative arrangement that allows, among other things, a better transfer of loads towards the rear of the pylon.

SUMMARY OF THE INVENTION

An object of the present invention is to propose a propulsion system comprising a turbojet, a pylon and elements for attaching the turbojet under the pylon with better load transfer.

To this end, is proposed a propulsion system of an aircraft, said propulsion system comprising:

- a turbojet extending around a longitudinal axis and having a vertical median plane passing through the longitudinal axis and having a fan casing with a rear face perpendicular to the longitudinal axis,
- a pylon presenting a rigid structure with a front part and a lower spar with a rear fitting fixed to it,
- a front engine attachment which is fixed between an upper part of the fan casing and the front part of the rigid structure,
- a front arch with a body fixed to the lower spar and two arms arranged on either side of the vertical median plane, each arm having a first end as one with the body and a second end fastened in an articulated manner to the rear face, and
- two lateral rods arranged on either side of the vertical median plane, each rod having a first end fastened in an articulated manner to the rear fitting and a second end fastened in an articulated manner to the rear face.

With such an arrangement, the forces are transmitted to the rear of the pylon.

Advantageously, the pylon has a first rib which is fixed inside the rigid structure at the fixation between the body and the lower spar and a second rib which is attached inside the pylon at the fixation between the rear fitting and the lower spar.

According to an embodiment, the second end of each arm is fastened directly to the rear face and the second end of each lateral rod is fastened to the arm on the same side of the vertical median plane.

Advantageously, each arm is inclined from below to top and from the second end to the first end, and for each arm, the propulsion system comprises a front rod having a first end fastened in an articulated manner to the rigid structure and a second end fastened in an articulated manner to said arm.

Advantageously, on each side of the vertical median plane, the propulsion system comprises a rear rod having a first end fastened in an articulated manner to the rear fitting and a second end fastened in an articulated manner to the rigid structure.

Advantageously, the articulations of the arms with the rear face are rotations around an axis perpendicular to the vertical median plane.

According to an embodiment, the second end of each rod is fastened directly to the rear face and the second end of each arm is fastened to the rod on the same side of the vertical median plane.

Advantageously, the articulations of the rods with the rear face are rotations around an axis perpendicular to the vertical median plane.

According to an arrangement, the front engine attachment comprises a front shackle fastened in an articulated manner via a first connection point arranged at the vertical median plane to the fan casing and via two second connection points arranged on either side of the vertical median plane to the front part, said front shackle is inclined from bellow to top and from the front to the back, and the three articulations of said front shackle are rotation around an axis perpendicular to the front shackle.

According to an arrangement, the front engine attachment comprises a front shackle fastened in an articulated manner via a first connection point to the front part and via two second connection points to the fan casing.

Advantageously, the first connection point and the second connection points are arranged at the vertical median plane, and each articulation of the front shackle is a rotation around an axis perpendicular to the vertical median plane.

Advantageously, the front engine attachment comprises at the vertical median plane, a cylindrical pin as one with the rigid structure and the axis of which is vertical, and a housing as one with the fan casing comprising a slot in which the cylindrical pin is introduced, the slot having a transverse dimension perpendicular to the vertical median plane equal to the diameter of the cylindrical pin and a longitudinal dimension parallel to the longitudinal axis bigger than the diameter of the cylindrical pin.

Advantageously, the first connection point is arranged at the vertical median plane and the second connection points are arranged on either side of the vertical median plane, and each articulation of the front shackle is a rotation around an axis parallel to the longitudinal axis.

The invention proposes also an aircraft comprising a wing and a propulsion system according to one of the preceding embodiment, of which the rigid structure is fastened beneath the wing.

BRIEF DESCRIPTION OF THE DRAWINGS

The characteristics of the invention will emerge more clearly from a reading of the following description of at least one embodiment, said description being produced with reference to the accompanying drawings, among which.

DETAILED DESCRIPTION OF THE PREFERRED EMBODIMENTS

Figure 1:
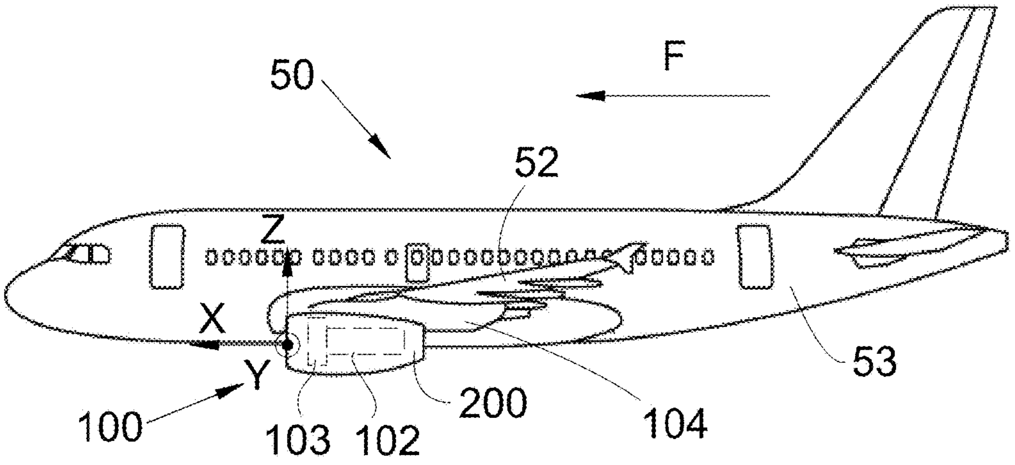
FIG. 1 represents a side view of an aircraft according to the invention.

FIG. 1 shows an aircraft 50 which has a wing 52 under which is mounted a propulsion system 100 according to the invention and which comprises a pylon 104 and a turbojet 102 housed here in a nacelle 200. In the embodiment of the invention shown in FIG. 1, the aircraft 50 has a fuselage 53 on each side of which a wing 52 is fixed.

By convention, X is the longitudinal axis of the turbojet 102, this axis X being parallel to a longitudinal direction of this turbojet 102. On the other hand, Y is the transverse axis of the turbojet 102 which is horizontal when the aircraft is on the ground, and Z is the vertical axis or vertical height when the aircraft is on the ground, these three axes X, Y and Z being orthogonal between them.

On the other hand, the terms "front" and "rear" are to be considered in relation to a direction of advance of the aircraft 50 during the operation of the turbojet 102, this direction being schematically represented by the arrow F.

The pylon 104 is generally symmetrical with respect to a vertical median plane XZ of the turbojet 102 which passes through the longitudinal axis X of the turbojet 102 and which is subsequently called median plane P and the transverse axis Y is perpendicular to the median plane P.

The vertical axis Z is inscribed in the median plane P and perpendicular to the longitudinal axis X.

FIGS. 2 to 5 show different embodiments of the propulsion system 100 of the invention.

Figure 2:
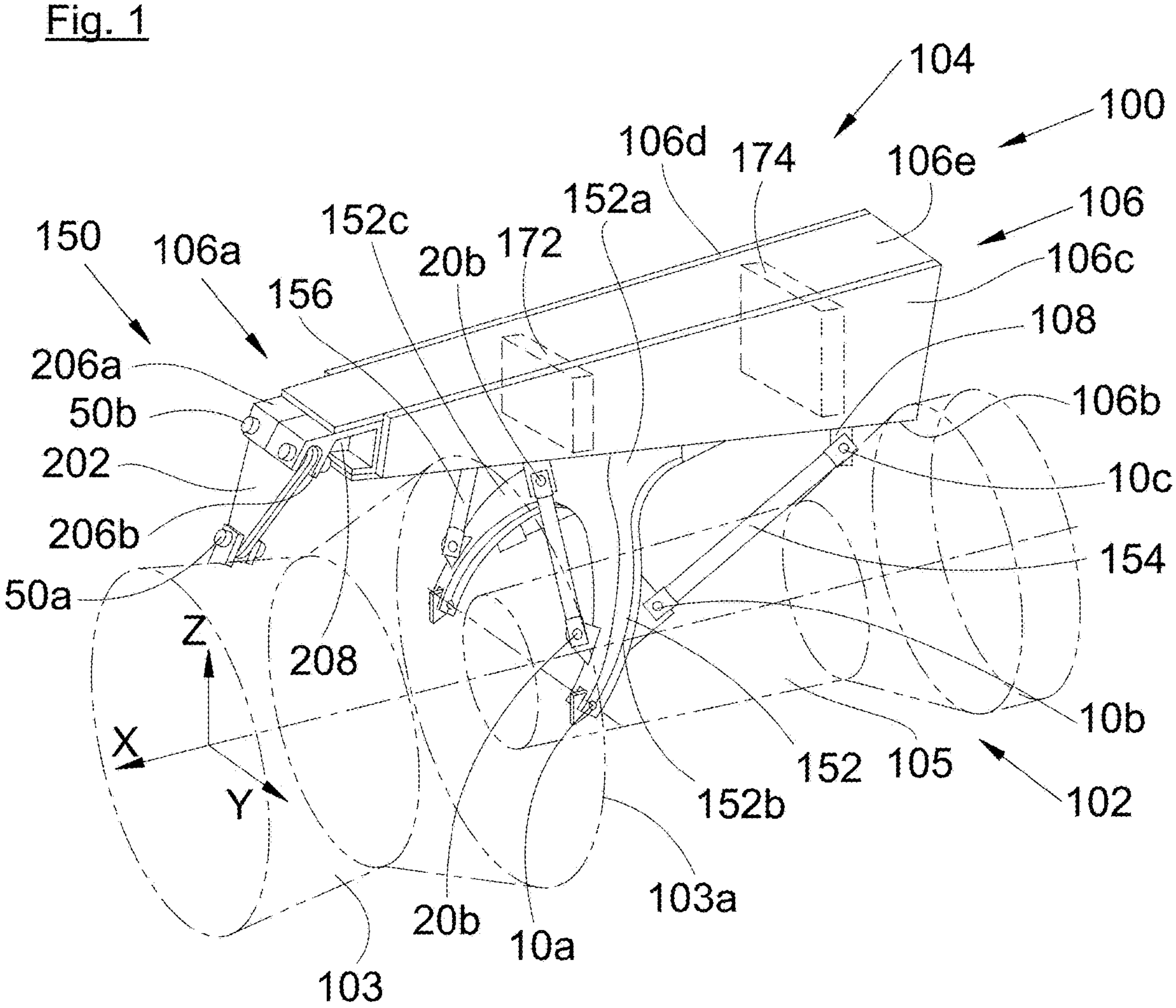
FIG. 2 is a perspective view of a propulsion system according to a first embodiment of the invention.

The propulsion system 100 comprises the turbojet 102 and the pylon 104 by which the turbojet 102 is attached to the wing 52 (not shown in FIG. 2). The pylon 104 is represented here by its rigid structure 106, also called primary structure, carrying an engine attachment which ensures the attachment of the turbojet 102 under the rigid structure 106.

The rigid structure 106 takes the form of a box which has a front part 106*a* which is at the front of the rigid structure 106, a lower spar 106*b* which extends below the rigid structure 106 and an upper spar 106*e* which extends to the top of rigid structure 106. The rigid structure 106 also has two lateral walls 106*c-d* on either side of the median plane P. These different spars and walls are fixed to each other to form the rigid structure 106.

To reinforce it structurally, the rigid structure 106 has here a first rib 172 and a second rib 174 which are fixed inside the rigid structure 106 to the various spars and walls. The second rib 174 is at the back of the first rib 172. Of course, a higher number of ribs is conceivable.

The rigid structure 106 is fixed beneath the wing 52 by a fastening system that is not represented, because it is outside the perimeter of the invention and can take any form known to the skilled person.

The turbojet 102 comprises from front to back, a fan casing 103 in which is mounted a fan of the turbojet 102 and an engine casing 105 which is attached to the rear of the fan casing 103 and in which the other elements of the turbojet 102 are housed as compression stages, a combustion chamber, turbine stages and an ejection nozzle.

The fan casing 103 has a rear face 103*a* which is perpendicular to the longitudinal axis X and thus extends in a plane parallel to the plane YZ.

The propulsion system 100 comprises a front engine attachment 150 which takes different forms in the different embodiments. The front engine attachment 150 is fixed between an upper part of the fan casing 103 and the front part 106*a* of the rigid structure 106. In other words, the front engine attachment 150 is attached at 12 o'clock at the fan casing 103.

The propulsion system 100 comprises a front arch 152 which has a body 152*a* fixed to and under the lower spar 106*b* and two arms 152*b-c* arranged on either side of the vertical median plane P. The body 152*a* is fixed above the engine casing 105 and the arms 152*b-c* are deployed on each side of said engine casing 105 at the rear of the rear face 103*a* of the fan casing 103.

Each arm 152*b-c* has a first end as one with the body 152*a* and a second end fastened in an articulated manner to the rear face 103*a*, especially at 3 o'clock and 9 o'clock. As explained below, the fixation between the second end of the arms 152*b-c* to the rear face 103*a* can be a direct fixation or an indirect fixation.

The propulsion system 100 comprises also two lateral rods 154 arranged on either side of the vertical median plane P. Each rod 154 has a first end fastened in an articulated manner to the rear fitting 108 via an aft connection point 10*c* and a second end fastened in an articulated manner to the rear face 103*a*. As explained below, the fixation between the second end of the rods 154 to the rear face 103*a* can be a direct fixation or an indirect fixation. Each articulation at an aft connection point 10*c* is a rotation around an axis globally perpendicular to the vertical median plane P, i.e. parallel to the transversal axis Y.

With such arrangement, the loads are introduced further aft in the rigid structure 106 which reduces its inertia needs and allows to have a reduced size at the front of the rigid structure 106.

To ensure a better rigidity at the lower spar 106*b*, the first rib 172 is fixed at the fixation between the body 152*a* and the lower spar 106*b* and is fixed simultaneously to the body 152*a* and the lower spar 106*b*. The fastening means which realize the fixation of the body 152*a* and the lower spar 106*b* are also attached to the first rib 172 for example by sandwiching the lower spar between the first rib 172 and the body 152*a*.

To ensure a better rigidity at the lower spar 106*b*, the second rib 174 is fixed at the fixation between the rear fitting 108 and the lower spar 106*b* and is fixed simultaneously to the rear fitting 108 and the lower spar 106*b*. The fastening means which realize the fixation of the rear fitting 108 and the lower spar 106*b* are also attached to the second rib 174 for example by sandwiching the lower spar between the second rib 174 and the rear fitting 108.

Figure 3:
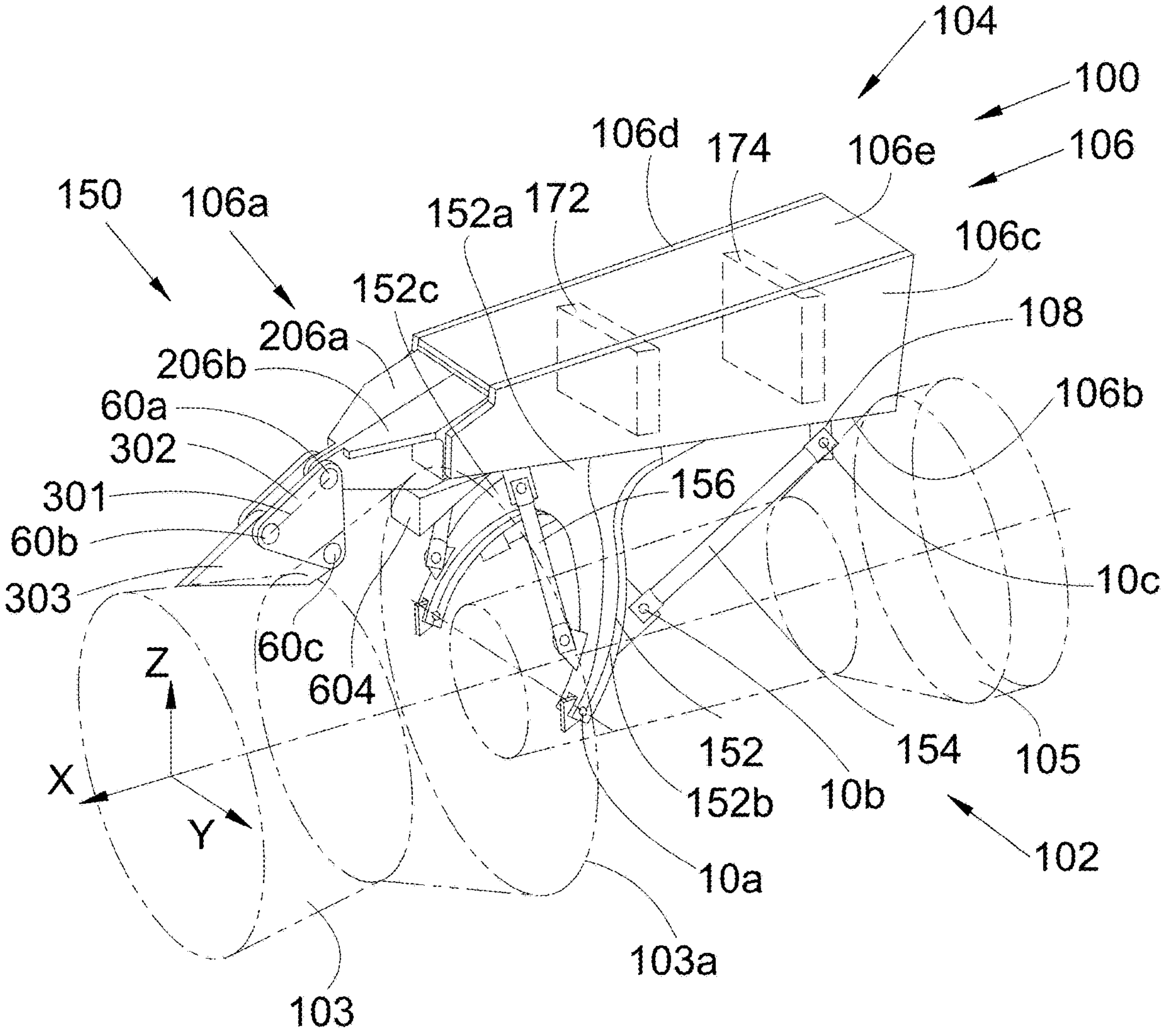
FIG. 3 is a perspective view of a propulsion system according to a second embodiment of the invention.
Figure 4:
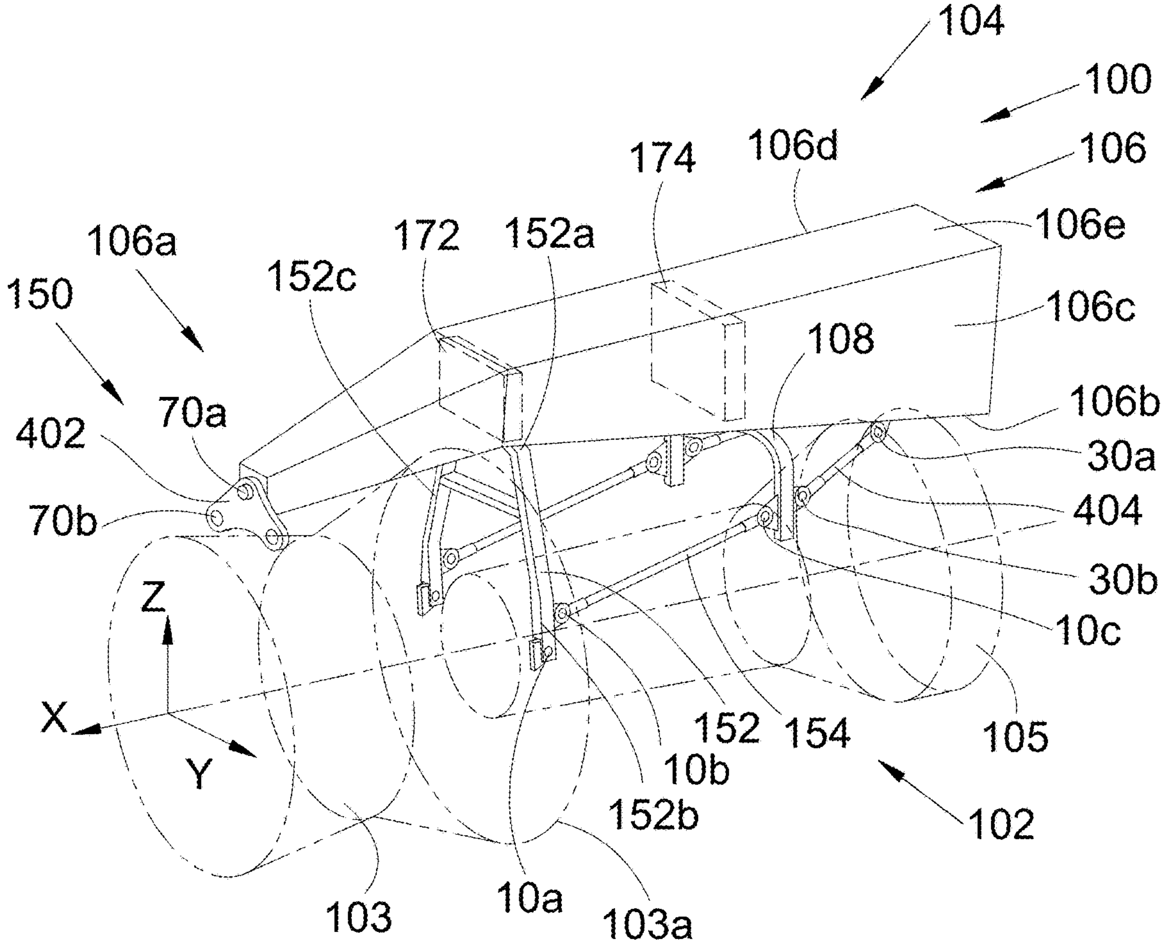
FIG. 4 is a perspective view of a propulsion system according to a third embodiment of the invention.

In the embodiments of FIGS. 2, 3 and 4, the second end of each arm 152*b-c* is fastened directly to the rear face 103*a* in an articulated manner via a front connection point 10*a* and the second end of each lateral rod 154 is fastened to the arm 152*b-c* 103*a* in an articulated manner via a rear connection point 10*b*, especially at a lower part of the arms 152*b-c*, on the same side of the vertical median plane P, i.e. indirectly to the rear face 103*a*.

Here, the fixation to the rear face 103*a* is realized through a clevis connection where a part, here a male part, of the clevis is attached to the rear face 103*a* and where a part, here a female part, of the clevis is attached to the arm 152*b-c*. A clevis pin fixes the parts of the clevis connection.

In each of these embodiments, the articulations of the arms 152*b-c* with the rear face 103*a* (at a front connection point 10*a*) are here rotations around an axis perpendicular to the vertical median plane P to manage the loads along the longitudinal axis X and the vertical axis Z. Each articulation at a rear connection point 10*b* is a rotation around an axis globally perpendicular to the vertical median plane P, i.e. parallel to the transversal axis Y.

In the embodiments of the FIGS. 2 and 3, each arm 152*b-c* is inclined from below to top and from the second end to the first end, i.e. the arms 152*b-c* climb from front to back. For each arm 152*b-c*, the propulsion system 100 comprises also a front rod 156 which has a first end fastened in an articulated manner to the rigid structure 106 via a first sub-connection point 20*a*, especially to the lower spar 106*b*, and a second end fastened in an articulated manner to said arm 152*b-c* via a second sub-connection point 20*b*. The front rods 156 are globally vertical. Here, each fixation of the front rods 156 is realized through a clevis connection the axis of which is globally perpendicular to the vertical median plane P, i.e. parallel to the transversal axis Y.

In these embodiments, the interfaces are compact.

In the embodiment of the FIG. 4, each arm 152*b-c* is in the same plane globally perpendicular to the longitudinal axis X and loads are transferred along the longitudinal axis X and the vertical axis Z.

On each side of the vertical median plane P, the propulsion system 100 comprises a rear rod 404 which has a first end fastened in an articulated manner to the rear fitting 108 via a first aft sub-connection 30*a* and a second end fastened in an articulated manner to the rigid structure 106 via a second aft sub-connection 30*b*, especially to the lower spar 106*b* to transfer the loads along the longitudinal axis X to the rear of the pylon 104. Here, each fixation of the rear rods 404 is realized through a clevis connection the axis of which is globally perpendicular to the vertical median plane P. A clevis pin fixes the parts of the clevis connection.

Figure 5:
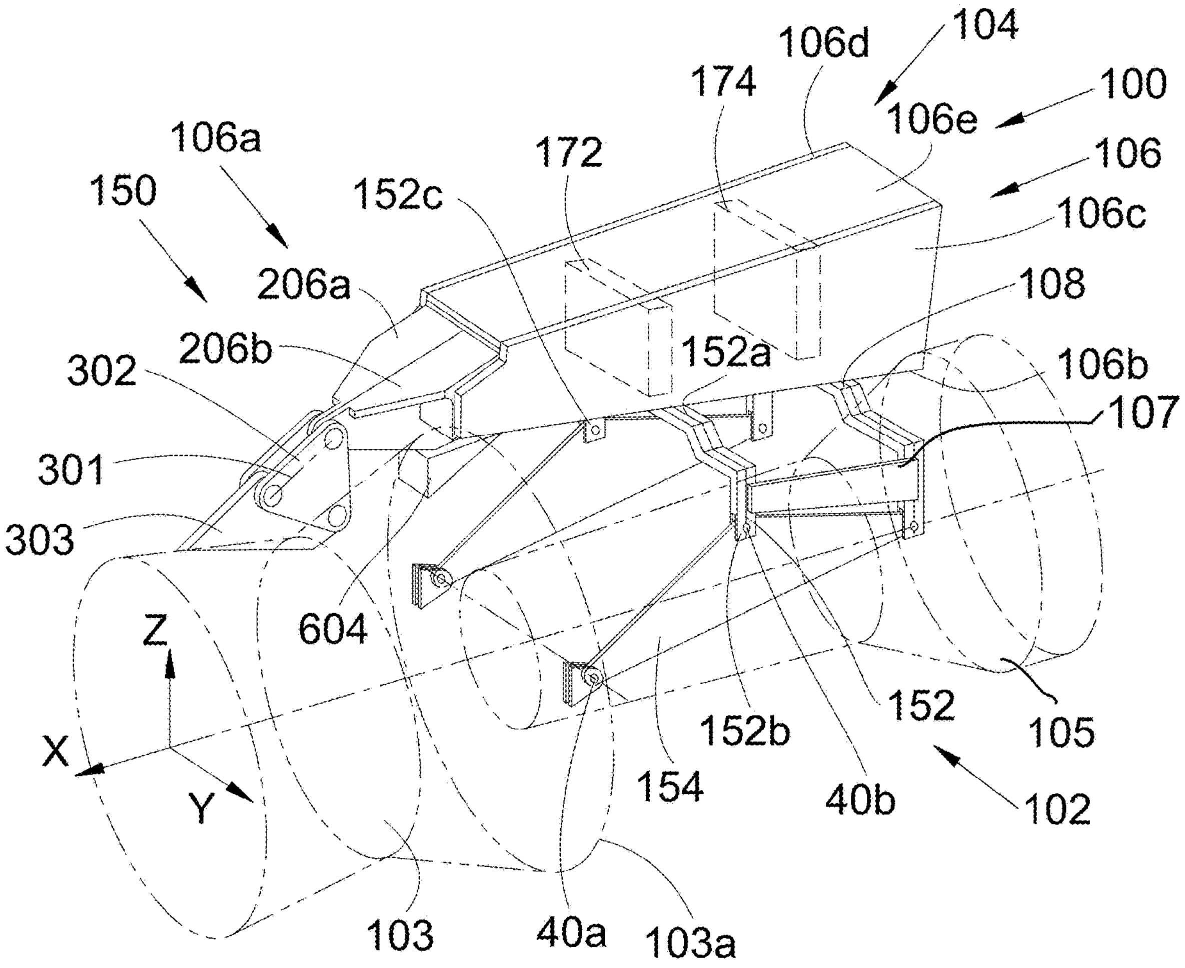
FIG. 5 is a perspective view of a propulsion system according to a fourth embodiment of the invention.

In the embodiment of FIG. 5, the second end of each rod 154 is fastened directly to the rear face 103*a* in an articulated manner via a front connection point 40*a* and the second end of each arm 152*b-c* is fastened to the rod 154 in an articulated manner via a rear connection point 40*b* on the same side of the vertical median plane P, i.e. each arm 152*b-c* is fastened indirectly to the rear face 103*a*.

Here, the fixation to the rear face 103*a* is realized through a clevis connection where a part, here a male part, of the clevis is attached to the rod 154 and where a part, here a female part, of the clevis is attached to the rear face 103*a*. A clevis pin fixes the parts of the clevis connection.

In this embodiment, the articulations of the rods 154 with the rear face 103*a* (at a front connection point 40*a*) are here rotations around an axis perpendicular to the vertical median plane P to manage the loads along the longitudinal axis X and the vertical axis Z. Each articulation at a rear connection point 40*b* is a rotation around an axis globally perpendicular to the vertical median plane P, i.e. parallel to the transversal axis Y.

In this embodiment, each rod 154 is doubled with two identical elements attached together.

The front arch 152 and the rear fitting 108 are also doubled parallel to the longitudinal axis X.

In this embodiment, the propulsion system 100 comprises on each side of the vertical median plane P, a rear bar 107 which has a first end rigidly fixed to the rear fitting 108 and a second end rigidly fixed to the arm 152*b-c*.

In the embodiments of the FIGS. 2 and 3, the front arch 152 is made of two sub-arches superimposed and in case of rupture of one of sub-arches, the loads are completely transferred through the other sub-arches.

The different front engine attachments 150 which are described below can be used with all the embodiments described above.

In the first variant of the front engine attachments 150 as represented in FIG. 2, the front engine attachment 150 comprises a front shackle 202 which is fastened in an articulated manner via a first connection point 50*a* to the fan casing 103 and via two second connection points 50*b* to the front part 106*a*.

The first connection point 50*a* is arranged at the vertical median plane P and the two second connection points 50*b* are arranged on either side of the vertical median plane P.

Here, each connection point 50*a-b* is realized through a clevis connection where a part, here a male part, of the clevis is attached to the front shackle 202 and where a part, here a female part, of the clevis is attached to the fan casing 103 or to the front part 106*a*. A clevis pin fixes the parts of each clevis connection.

The front shackle 202 is inclined from below to top and from the front to the back and the three articulations (at the three connection points 50*a-b*) of said front shackle 202 are rotations around an axis perpendicular to the front shackle 202. It means that the clevis pin of each clevis connection is inclined with respect to the front shackle 202.

For safety reasons, the front part 106*a* is realized of two boxes 206*a-b* attached to the rigid structure 106 and arranged on each side of the vertical median plane P. Each box 206*a-b* is fixed to the front shackle 202 by one of the second connection points 50*b*. In case of rupture of one of the boxes 206*a-b*, the loads are completely transferred through the other box 206*b-a*.

In the same manner, the front shackle 202 is made of two similar sub-shackles fixed together to compensate a rupture of one of the sub-shackles.

Here a vertical rib 208 parallel to the vertical median plan P is provided centrally in said boxes 206*a-b*.

The orientation of the front shackle 202 enables the second connection points 50*b* to transfer loads in Y direction as the clevis pins of the first connection point 50*a* is oriented in a direction near of the longitudinal axis X and the front shackle 202 allows a combined transfer along projection of X and Z axes to transfer loads to the front part 106*a* of the rigid structure 106.

In the second and third variants of the front engine attachments 150 as represented respectively in FIGS. 3 and 4, the front engine attachment 150 comprises a front shackle 302, 402 which is fastened in an articulated manner via a first connection point 60*a*, 70*a* to the front part 106*a* and via two second connection points 60*b-c*, 70*b* to the fan casing 103. The second variant is also represented in FIG. 5.

In the second variant, the first connection point 60*a* and the second connection points 60*b-c* are arranged at the vertical median plane P, and each articulation of the front shackle 302 at the connection points 60_a-c_ is a rotation around an axis perpendicular to the vertical median plane P, i.e. parallel to the transversal axis Y. The second connection points 60_b-c_ are fixed to a plate 303 as one with the fan casing 103.

In this variant, the front shackle 302 is made of two similar sub-shackles spaced apart from each other to compensate a rupture of one of the sub-shackles and each connection point 60_a-c_ is realized through a clevis connection where a part, here a female part, of the clevis is attached to the front shackle 302 and where a part, here a male part, of the clevis is attached to the plate 303 of the fan casing 103 or to the front part 106_a_. A clevis pin parallel to the transversal axis Y fixes the parts of each clevis connection.

The upper second connection point 60_b_ and the first connection point 60_a_ form a line 301 inclined from below to top and from the front to the back and the three articulations of said front shackle 302 are rotations around an axis perpendicular to the front shackle 302.

For safety reasons, the front part 106_a_ is realized of two boxes 206_a-b_ attached to the rigid structure 106 and arranged on each side of the vertical median plane P. The two boxes 206_a-b_ are fixed simultaneously to the front shackle 302 by the first connection point 60_a_. In case of rupture of one of the boxes 206_a-b_, the loads are completely transferred through the other box 206_b-a_.

Here a vertical rib 208 parallel to the vertical median plan P is provided centrally in said boxes 206_a-b_.

The orientation of the front shackle 302 enables the transfer of the loads in the direction of the line 301.

In the variant of FIG. 3, each box 206_a-b_ has a L shape with a vertical panel and a horizontal panel. The two vertical panels are of the same shape and superimposed one to the other so that the horizontal ones offer a global homogenous horizontal surface. In the present embodiment, the flat horizontal surface is geometrically made of the combination of a rectangle with a rhombus. The boxes 206_a-b_ are symmetrical to the vertical median plane P to realize a segregation necessary for providing failsafe security.

The two vertical panels are fixed simultaneously to the front shackle 302 by the first connection point 60_a_.

The lower second connection point 60_c_ of the front shackle 302 is a waiting fail safe connection point which is inactive and becomes active if the upper second connection point 60_b_ breaks. For example, the diameter of the clevis pin is smaller than the hole of the plate 303 in which the clevis pin is arranged and the contact between the clevis pin and the plate 303 becomes active in case of failure of the upper second connection point 60_b_.

Figure 6:
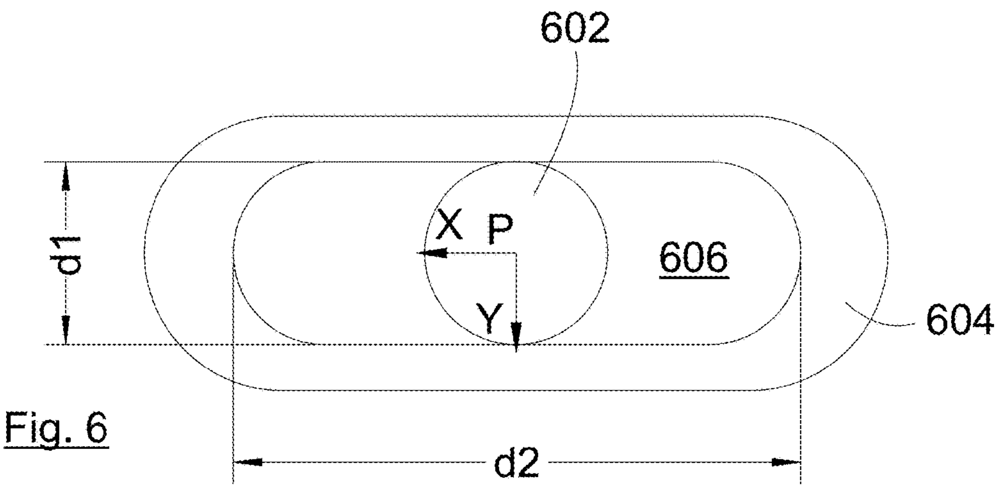
FIG. 6 is a top view of a specific articulation used in some of the embodiments of the invention.

As represented in FIG. 6, in the second variant, the front engine attachment 150 comprises at the vertical median plane P, a cylindrical pin (spigot) 602, the axis of which is vertical, i.e. parallel to the vertical axis Z. The cylindrical pin 602 is as one with the rigid structure 106 and extends downward towards the fan casing 103.

The front engine attachment 150 comprises also a housing 604 as one with the upper part of the fan casing 103. The housing 604 comprises a slot 606 in which the cylindrical pin 602 is introduced, the slot 606 has a transverse dimension d1 perpendicular to the vertical median plane P equal to the diameter of the cylindrical pin 602 and a longitudinal dimension d2 parallel to the longitudinal axis X bigger than the diameter of the cylindrical pin 602. With such a configuration, only the loads parallel to the transverse axis Y are transferred (not in the longitudinal direction X) and the loads are transferred in a plane XZ.

One advantage of this embodiment includes the simple engine installation on the pylon 104 requiring only a translation along the vertical axis Z of the turbojet 102 towards the pylon 104 followed by the introduction of the clevis pins. The slotted bearing of the cylindrical pin 602 makes the system statically determinate and as a consequence leads to a simpler tolerance management.

In the third variant, the first connection point 70_a_ is arranged at the vertical median plane P and the two second connection points 70_b_ are arranged on either side of the vertical median plane P. Each articulation of the front shackle 402 at the connection points 70_a-b_ is a rotation around an axis parallel to the longitudinal axis X. The loads are transferred along the transverse axis Y and the vertical axis Z.

In this variant, each connection point 70_a-b_ is realized through a clevis connection where a part, here a female part, of the clevis is attached to the front shackle 402 and where a part, here a male part (not represented), of the clevis is attached to the fan casing 103 or to the front part 106_a_. A clevis pin parallel to the longitudinal axis X fixes the parts of each clevis connection.

Figure 7:
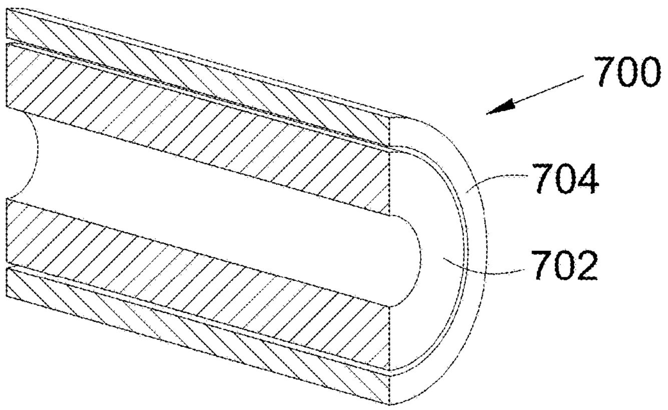
FIG. 7 is an example of a double axis used in the invention.

As represented in FIG. 7, each clevis pin 700 can be doubled. The clevis pin 700 comprises an internal cylinder 702 arranged in a concentric manner in an external cylinder 704. Thus, when one cylinder is broken the other one still remains.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion system of an aircraft, said propulsion system comprising:

a turbojet extending around a longitudinal axis and having a vertical median plane passing through the longitudinal axis and having a fan casing with a rear face perpendicular to the longitudinal axis, a pylon presenting a rigid structure with a front part and a lower spar with a rear fitting fixed to the lower spar, a front engine attachment which is fixed between an upper part of the fan casing and the front part of the rigid structure, a front arch with a body fixed to the lower spar and two arms arranged on either side of the vertical median plane, each arm having a first end formed one with the body and a second end fastened in an articulated manner to the rear face, two lateral rods arranged on either side of the vertical median plane, each rod having a first end fastened in an articulated manner to the rear fitting and a second end fastened in an articulated manner to the rear face, wherein the second end of each arm is fastened directly to the rear face, wherein the second end of each lateral rod is fastened to the arm on a same side of the vertical median plane, and wherein, for each arm, the propulsion system comprises a front rod having a first end fastened in an articulated manner to the rigid structure and a second end fastened in an articulated manner to said arm.

2. The propulsion system according to claim 1, wherein the pylon has a first rib which is fixed inside the rigid structure at a fixation between the body and the lower spar and a second rib which is attached inside the pylon at a fixation between the rear fitting and the lower spar.

3. The propulsion system according to claim 1, wherein articulations of the arms with the rear face are rotations around an axis perpendicular to the vertical median plane.

4. The propulsion system according to claim 1, wherein each arm is inclined from below to top and from the second end to the first end.

5. The propulsion system according to claim 1, wherein the second end of each rod is fastened directly to the rear face, and wherein the second end of each arm is fastened to the rod on a same side of the vertical median plane.

6. The propulsion system according to claim 5, wherein articulations of the lateral rods with the rear face are rotations around an axis perpendicular to the vertical median plane.

7. The propulsion system according to claim 1, wherein the front engine attachment comprises a front shackle fastened in an articulated manner via a first connection point arranged at the vertical median plane to the fan casing and via two second connection points arranged on either side of the vertical median plane to the front part, wherein said front shackle is inclined from below to top and from the front to the back, and wherein three articulations of said front shackle are rotations around an axis perpendicular to the front shackle.

8. The propulsion system according to claim 1, wherein the front engine attachment comprises a front shackle fastened in an articulated manner via a first connection point to the front part and via two second connection points to the fan casing.

9. The propulsion system according to claim 8, wherein the first connection point and the second connection points are arranged at the vertical median plane, and wherein each articulation of the front shackle is a rotation around an axis perpendicular to the vertical median plane.

10. The propulsion system according to claim 9, wherein the front engine attachment comprises at the vertical median plane, a cylindrical pin as one with the rigid structure and an axis of which is vertical, and a housing as one with the fan casing comprising a slot in which the cylindrical pin is introduced, the slot having a transverse dimension perpendicular to the vertical median plane equal to a diameter of the cylindrical pin and a longitudinal dimension parallel to a longitudinal axis bigger than the diameter of the cylindrical pin.

11. The propulsion system according to claim 8, wherein a first connection point is arranged at the vertical median plane and a second connection point is arranged on each side of the vertical median plane, and wherein each articulation of the front shackle is a rotation around an axis parallel to the longitudinal axis.

12. An aircraft comprising:

a wing, and the propulsion system according to claim 1, wherein the rigid structure is fastened beneath the wing.

* * * * *